United States Patent [19]

Fenske

[11] Patent Number: 4,697,380
[45] Date of Patent: Oct. 6, 1987

[54] BAIT CONTAINER

[76] Inventor: Dale Fenske, 2027 Comet St., New Orleans, La. 70114

[21] Appl. No.: 851,731

[22] Filed: Apr. 14, 1986

[51] Int. Cl.⁴ ............................................. A01K 97/04
[52] U.S. Cl. ......................................... 43/55; 220/263
[58] Field of Search ................ 43/55, 56, 57; 220/263

[56] References Cited

U.S. PATENT DOCUMENTS

| | | | |
|---|---|---|---|
| 1,938,013 | 12/1933 | Folsom | 220/263 |
| 1,939,139 | 12/1933 | Schott | 220/263 |
| 2,246,975 | 6/1941 | Geibel | 220/69 |
| 2,631,402 | 3/1953 | Lastofka | 43/55 |
| 2,811,329 | 10/1957 | Press | 220/263 |
| 3,452,469 | 7/1969 | White | 43/55 |
| 3,958,359 | 5/1976 | Doughty | 43/55 |
| 4,119,240 | 10/1978 | Dumas | 220/263 |
| 4,353,182 | 10/1982 | Junkas | 43/55 |

FOREIGN PATENT DOCUMENTS 563363 11/1932 Fed. Rep. of Germany ...... 220/263

Primary Examiner—Gene P. Crosby
Attorney, Agent, or Firm—Pravel, Gambrell, Hewitt & Kimball

[57] ABSTRACT

The apparatus is a refrigerated bait box having a main body portion including a bottom wall, and front, back and first and second side walls, defining a principle interior chamber with an open top end. A main lid is hinged relative to the top edge of the back wall for pivotal movement between opened and closed positions. A recessed channel is provided along the top edge of the container portion for housing and supporting a webbed basket which occupies only a portion of the container space, with the interior of the space between the bottom of the basket and the floor portion of the container portion serving to house ice in the cubed form for allowing maintenance of the bait contained in the basket to remain cold yet the basket allowing any moisture from the bait to fall into the lower ice containing portion. There is further included a foot activated means for moving the top lid for "hands free" opening and closing. In the closed position the lid has a sealing member between itself and the main body portion and there is further included a closer lock for maintaining the lid closed.

9 Claims, 5 Drawing Figures

BAIT CONTAINER

BACKGROUND OF THE INVENTION

1. Field of the Invention

The present invention relates to containers for fishing bait. More particularly, the apparatus of the present invention relates to a container for fish bait which is refrigerated on a first level with the use of cubed ice and contains a basket at a level above the ice-containing portion for containing live or dead bait.

2. General Background

In the field or art of fishing, one of the more essential aspects of successful fishing is the utilization of suitable maintained bait for attracting the fish.

Particularly, the area of natural bait, such as shrimp, shinners, or other "live" or "dead" bait, in order to maintain the bait fresh during the course of fishing sojourn, the bait must be kept very cold, which would often time require that the bait be maintained within an ice chest placed on cubes of ice. The shortcoming of this particular method of maintaining the bait in the iced stage, is that often times the bait will absorb moisture from the ice, and become quite soggy and undesirable as quality bait. In addition, the if the bait is frozen, when purchased, as the bait would thaw out to the near freezing point, the moisture released from the thawing would be maintained within the bait container, and likewise cause the bait to be contained in a pool of water and therefore become undesirably soggy.

The following patents address receptacles or ice chests which may be utilized for containing bait, and are pertinent in the art:

U.S. Pat. No. 3,958,359 issued to Doughty, entitled "Sportsman's Combination Receptacle and Ice Chest", relates to an ice chest having a portable base member with a hollow interior, the top of the base member opposite the bottom wall being opened so as to allow access. There is a container slidably fitted into the hollow interior of the base member having an open top. There is further spaces between the container periphery in the periphery of the base member to facilitate the addition of ice. Further there is a cover member fitted onto the top base member to cover the container top during storage within the container.

U.S. Pat. No. 4,353,182, issued to Junkas, et al, entitled "Fishing Box", relates to a fishing box which is able to accommodate various items of equipment, rods, reels, tackle box, bait container, food container, and the fish caught on the trip, in a signal container. The box is broken down into a plurality of compartments for various items, and actually addresses the entire combination of storage rather than the particular bait box.

U.S. Pat. No. 2,246,975 issued to Giebel, entitled "Sanitary Waste Can", although not addressing a storage container for bait, does address the use of a foot actuated peddle for opening up a top cover of a container in its use.

U.S. Pat. No. 1,929,139 issued to Schott entitled "Waste Receptacle" likewise teaches a waste receptacle with a foot actuated member for opening the cover of the receptacle.

U.S. Pat. No. 4,119,240 issued to Dumas, et al, entitled "Positive Open Receptacle" again teaches the use of a receptacle that is opened via a foot actuated member with a foot actuated member contained within the bottom of the receptacle.

U.S. Pat. No. 2,811,329 issued to J.E. Press, et al, entitled "Step on Type Waste Receptacle Unit", teaches the use of a foot actuated waste receptacle unit with a member contained therein.

U.S. Pat. No. 4,445,619 issued to Kubic, et al, entitled "Pedal Bin", teaches the use of an apparatus for opening a container bin whereby when pressure is applied to a foot member the basket is then tilted to prop open the container lid.

U.S. Pat. No. 4,303,174 issued to Anderson, entitled "Foot Operated Container Covering Device", likewise teaches the use of an apparatus having a foot actuated opener for the container top portion of the receptacle during use.

Several other patents pertient to the bait container art includes U.S. Pat. No. 3,751,845 issued to Vine Leauwen; U.S. Pat. No. 2,919,169 issued to Jackson; U.S. Pat. No. 3,051,540 issued to Wood; U.S. Pat. No. 3,545,809 issued to Krenc; and U.S. Pat. No. 2,657,734 issued to Frost.

SUMMARY OF THE PRESENT INVENTION

The apparatus of the present invention addresses and solves the problem which is confronted in the present state of the art in a straightforward manner. What is provided is a refrigerated bait box having a main body portion including a bottom wall, and front, back and first and second side walls, defining a principal interior chamber with an open top end; a main lid hinged relative to the top edge of the back wall for pivotal movement between opened and closed positions; a recessed channel along the top edge of the container portion for housing and supporting a webbed basket which occupies only a portion of the container space, with the interior of the space between the bottom of the basket and the floor portion of the container portion serving to house ice in the cubed form for allowing maintainance of the bait contained in the basket to remain cold, yet allowing any moisture from the bait to fall into the lower ice containing portion. There is further included a foot activated means for moving the top lid from its open to its closed positions for "hands free" opening and closing. In the closed position the lid has a sealing member between itself and the main body portion and there is further included a closer lock for maintaining the lid closed.

A second embodiment would include, in addition, to the features of the principal embodiment a base plate supporting the main body portion, the base plate on the front end thereof having a grooved opening for allowing grasping with the hands to carry the apparatus from point to point, the second embodiment being of substantial smaller sized than the principal embodiment in its structure.

DETAILED DESCRIPTION OF THE PERFERRED EMBODIMENT

Figure 1:
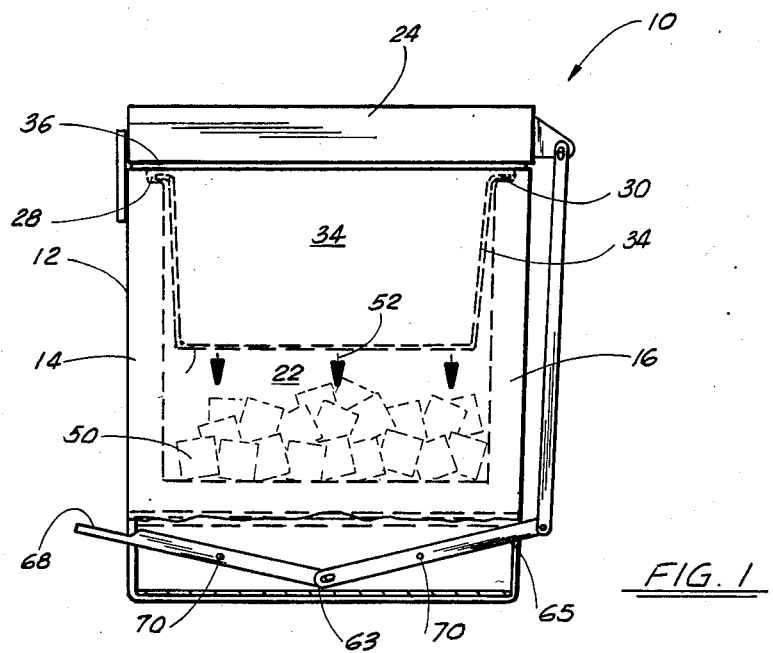
FIG. 1 is a side view of the principal embodiment of the apparatus of the present invention illustrating the apparatus in the closed position.
Figure 2:
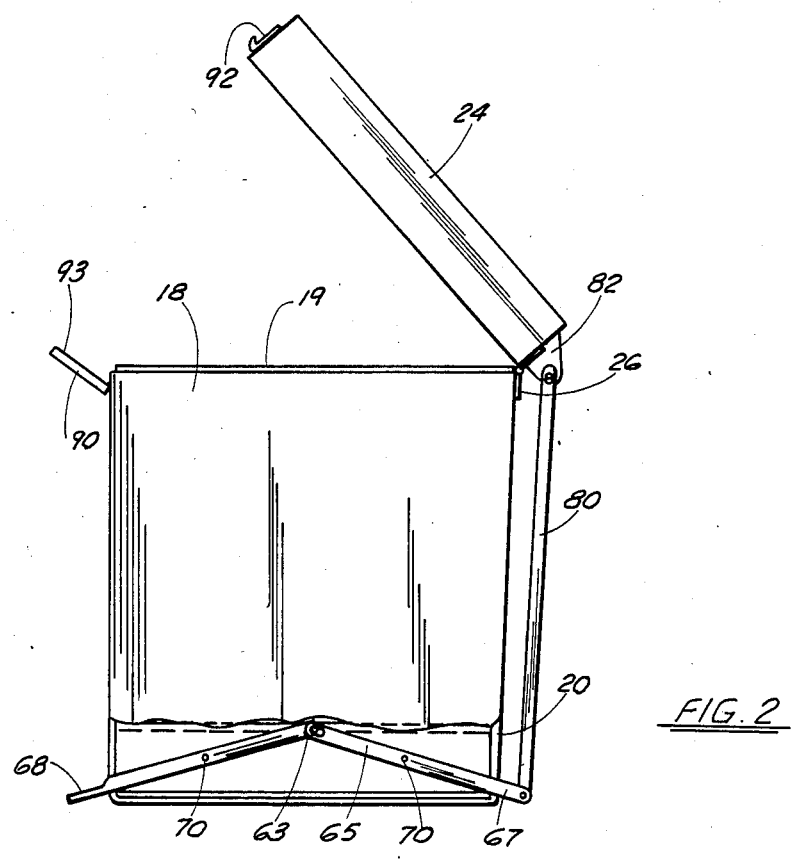
FIG. 2 is a side view of the principal embodiment of the apparatus of the present invention illustrating the apparatus in the open position.
Figure 3:
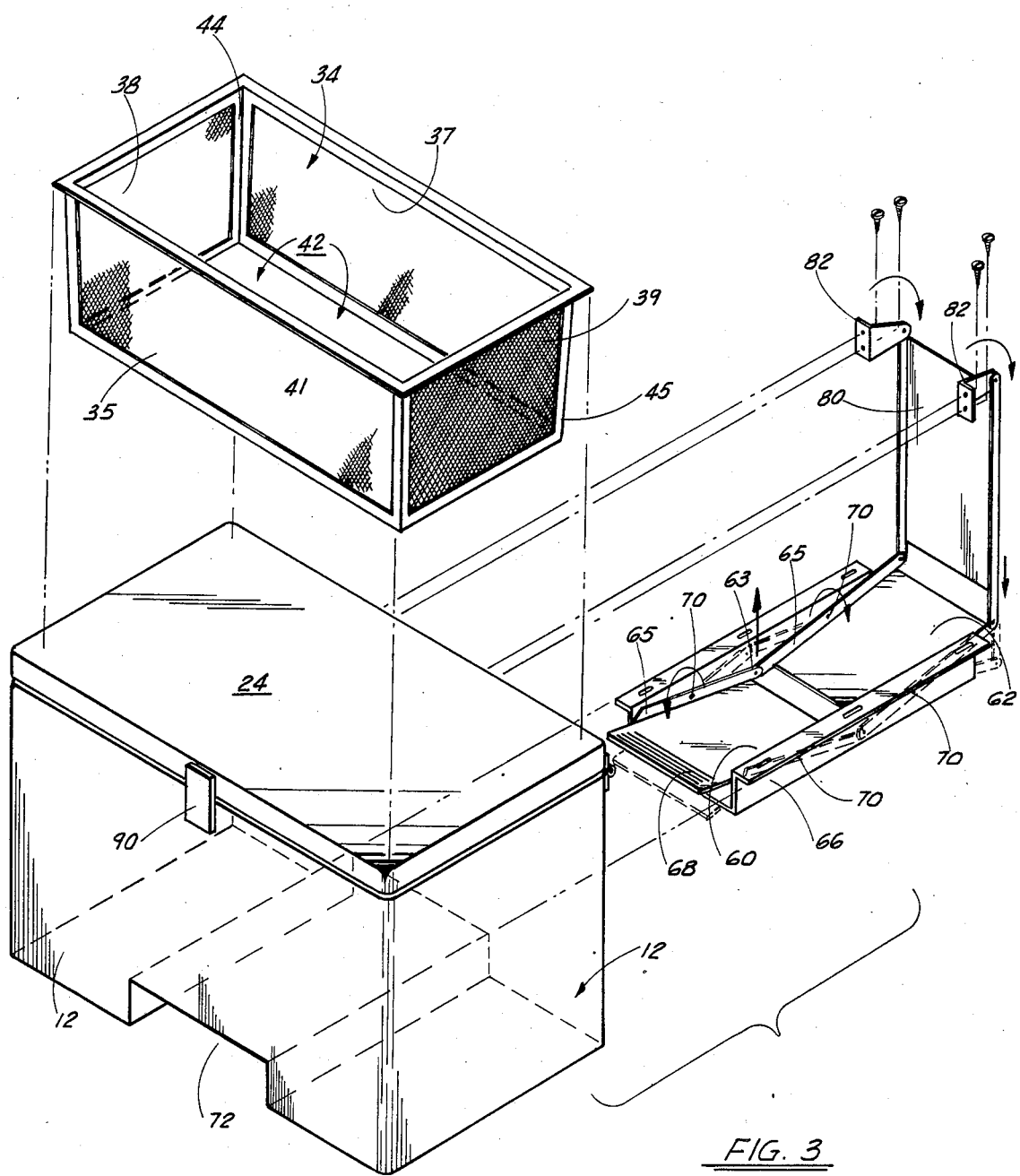
FIG. 3 is an exploded view of the principal embodiment of the apparatus of the present invention.

FIGS. 1-3 illustrate in detail the perferred embodiment of the apparatus of the present invention designated by the numeral 10. Bait box 10 would generally comprise a main body portion 12 which would comprise front and rear wall portions 14 and 16 respectively and left and right side wall portions 18 and 19 (not illustrated) respectively, and integral floor portion 20 to define a main container space 22 therewithin. Apparatus 10 would further comprise a lid portion 24 hingedly attached via piano hinge 26 along the rear wall 16 of container portion 12, so that lid 24 is movable between a first closed position as seen in FIG. 1 and a second opened position as seen in FIG. 2 via hinge 26, the mechanism for opening and closing lid 24 to be described further.

As seen in the Drawings, particularly FIGS. 1 and 3, front wall 14 and rear wall 16 would further include a channel 28 along their top edges, for accommodating a lid member 30 of basket 34 as it is placed into container space 22, lid member 30 resting within channel 28 so as to be maintained flush with the top edge of walls 14 and 16 so that top portion 24 may sealably engage the wall portions of the container and seal via a gasket 36. Basket 34, as seen particularly in FIG. 3, is generally rectangular in shape and again resting within the container space 22 of the main body portion, and is construced likewise of a front and rear wall portions 35 and 37 respectively, side walls 38 and 39 with bottom portion 41 to define a container space 42 therewithin. Basket 34 although constructed of a metal frame 44, is the principal construction of the side, front and rear walls and the bottom portion. A mesh material such as plastic mesh or the like having a plurality of ports 45 throughout its surface area allows moisture to flow from within, and cool air to flow into the basket to maintain its contents cool. As seen in FIG. 1, with basket 34 in position within main principal container space 22, the floor portion 41 of basket 34 reaches a depth of approximately ½ of the entire depth of container space 22, therefore ther is providing a void space between the bottom portion 41 of basket 34 and the lower floor portion 20 of the main body portion.

As seen in FIG. 1, in the use of the apparatus one would place a plurality of ice cubes 50 within the lower void space between the basket 34 and the floor portion 20, which would serve as a means for refrigerating the contents within basket 34 which would usually be frozen bait, or other live bait. Therefore, due to the structure of the bottom portion and walls of basket 34, as the live bait or frozen bait would lose moisture, the moisture would flow in the direction of Arrows 52 into the void space containing the ice 50, and therefore, any excess moisture which would normally collect around the bait contained in basket 34 would gravitate down into the void space and therefore would maintain the bait in the relatively low humid yet cool condition. It should be noted that in order to maintain the temperature and humidity within the container portion 22 of the apparatus in a reduced state, preferably the wall portions and the lid portion and the bottom portion would be thoroughly insulated so that heat could not be lost to the outside when the lid is in the closed position as seen in FIG. 1.

Turning now to the mechanism which is utilized in the principal embodiment as seen in FIG. 1-3 for opening and closing the lid portion 24, now reference is made primarily to FIG. 3, in exploded view. That mechanism incorporates a pair of plate members 60 and 62, the plate members being hingedly joined at point 63 via a hinge pin or the like, each of the plate members having a pair of side walls 65 for mounting the plate members within a frame 66. As is seen in the FIGURE, front plate member 60 has a foot contact portion 68 extruding from frame 66, with the side walls 65 of the plate members pivotally engaged to frame 66 at points 70. These points 70 are seen more clearly in FIGS. 1 and 2. The entire frame portion 66 is housed within a recessed area 72 contained within the bottom portion of main body portion 12, the frame 66 being attached to the bottom portion via screws or the like. It should be noted, particularly in FIGS. 1 and 2, that following the positioning of frame 66 within recessed area 72 as seen in the FIGURES, foot contact portion 68, upon being made contact thereon, would move to a down position which would likewise, due to its fulcrum point at 70, move the end portion of plate 60 at point 63 into the up position as seen in FIG. 2. Joint 63, in the up position, would likewise impart movement of rear plate 62 to likewise move downward at end portion 67. This fulcrum hinge movement of the two plates being hinged end to end, is the activating mechanism for ultimately opening and closing top portion 24.

This is accomplished by linking top portion 24 via vertical linking plate member 80 between the end portions 67 of rear plate 62 and mounting bracket 82 which is mounted on the rear face of top portion 24. Therefore, as seen in the FIGURES, upon the depression of foot member 68, and the likewise similar movement of rear plate 62 for imparting downward movement onto end portion 67, this downward movement would in turn pull downward on vertical linking plate 80, which would likewise impart a downward pull on mounting bracket 82 and upon the imparting of force downward on the rear face of top portion 24 would move it into the up position as seen in FIG. 2. Of course, when foot portion 68 is placed in the position as seen in FIG. 1, the reversal of the movements take place, and when rearend portion of plate 62 moves to the up position linkage member 80 likewise imparts upward force on mounting bracket 82 to move top portion into the down sealing position. Therefore, this opening and closing of top portion 24 by a foot activated mechanism enables one to maintain ones hands doing other tasks yet having the ability to open and close top portion 24 by depreessing foot peddle 68 in the apparatus. Likewise, the positioning of the internal workings of the mechanism being housed within the confines of recessed 72 beneath the bottom portion 20 of main body portion 12 is a unique feature in that the mechanism is not exterior to the apparatus and yet accomplishes the same tasks.

It should be seen also that once the mechanism is placed in the closed position as seen in FIG. 1, so that there can be no inadvertent spillage or the like, there is a latch member 90 which incorporates a latch key 92 on the top portion and a latch plate member 93 for maintaining the top portion in the closed position as seen in FIG. 1.

Figure 4:
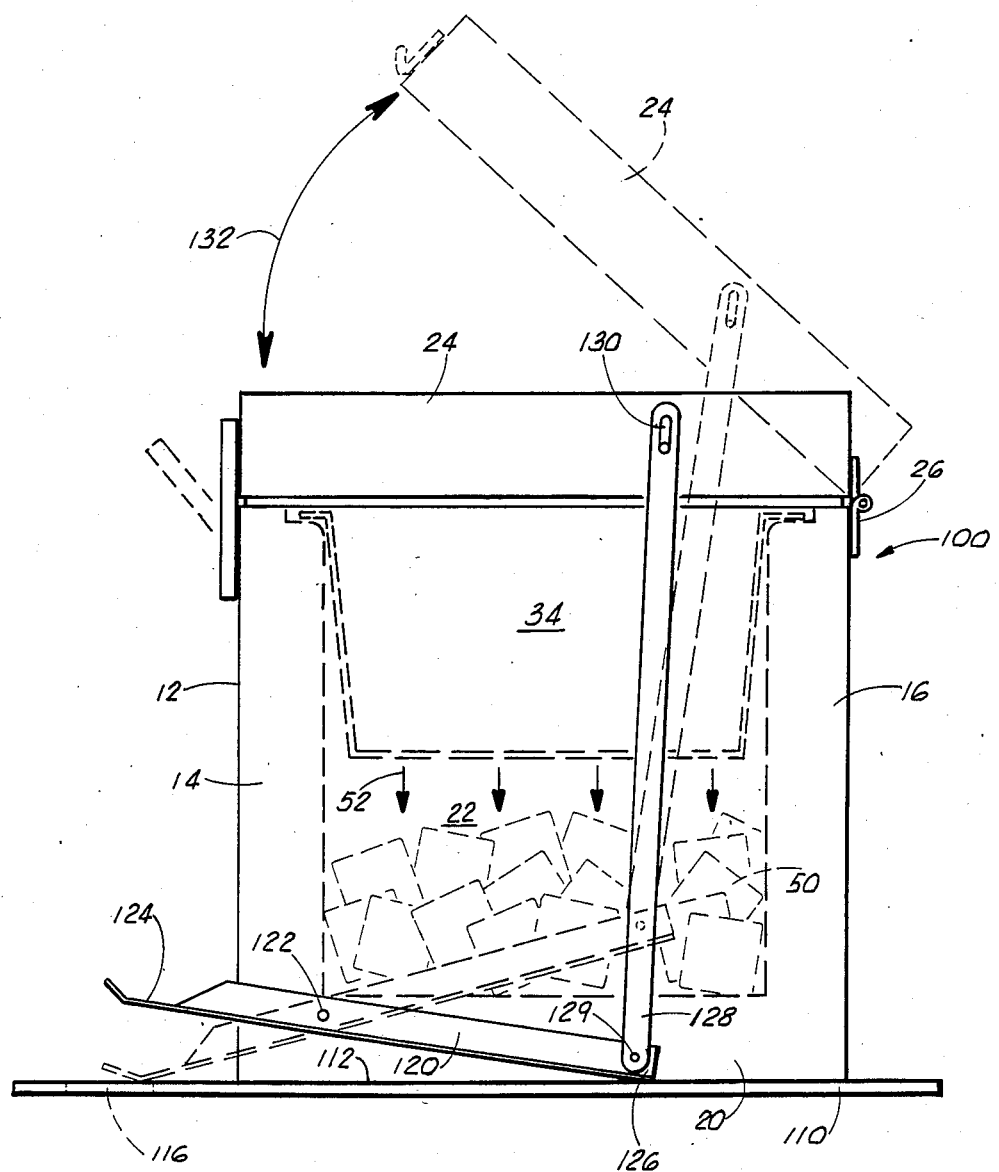
FIG. 4 is a side view of an alternate embodiment of the principal embodiment of the apparatus of the present invention illustrating the apparatus as both in the closed position in phantom view.
Figure 5:
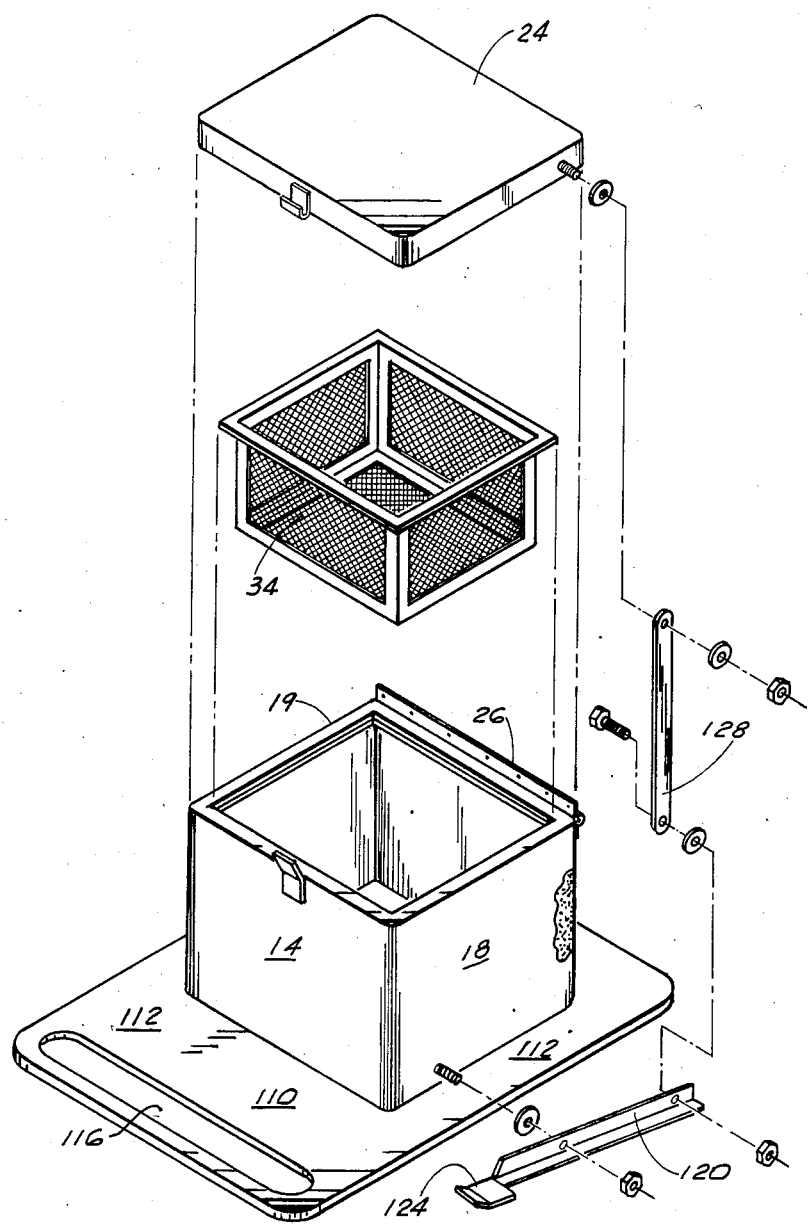
FIG. 5 is an overall exploded view of the alternate embodiment of the apparatus of the present invention.

Turning now to the second embodiment of the apparatus, although this may also be considered a principal embodiment, the features of this particular embodiment although very similar in many respects to the principle embodiment as seen in FIGS. 1-3, also enjoy novel aspects in themselves as will be discussed at this point. For purposes of brevity, it should be considered that reference will be made to the fact that the second embodiment also contains a main body portion 12 having a front wall 14, rear wall 16 and side walls 18 and 19, a floor portion 20 all defining an inerior storage space 22 therewithin, the front, rear, side walls and floor portion being thoroughly insulated for maintaining of the temperature within the space 22 during use of the apparatus. Likewise, container space 22 would house, in the similar fashion, a basket portion 34 again having a mesh surface for the bottom and side walls of the basket, for allowing again moisture to move from within the basket to the lower container portion between the bottom of the basket and the floor of the container as indicated by Arrows 52. Therefore in terms of usage, the apparatus 100 as seen in FIGS. 4 and 5 is similar in all respects to the apparatus number 10 as seen in FIGS. 1-3 in that it is used for housing bait in the upper basket portion 34 and to maintain the bait at a level above the level of ice 50 contained on the floor of the container which would maintain the bait cool yet free from the moisture.

What is similar in the two mechanisms is the most striking would be the size. The size of the mechanism contained in FIGS. 4 and 5 is a much reduced size than is utilized primarily by a single fisherman for housing a certain quantity of bait. In addition, there would be further included a base portion 110 which could be a sheet of heavyweight plastic or the like wherein the container portion 100 is mounted via gluing or the like thereupon for being permanently adhered thereto. As seen in FIG. 5, the base portion 110 is of a more substantial rectangular shape and provides a border 112 around the walls of the apparatus for allowing it to have a more substantial base as it is set down. In addition, border 112 along the front wall 14 of the container 101 is of the most substantial distance, as seen in FIG. 5 there is provided an elongated slot 116, which is cut into the border 112 of the base portion 110. Slot 116 serves as a means for grasping ones hand or fingers into slot 116 and carrying the entire apparatus from one point to the next i.e., from the wharf into the boat and back. Therefore, from the sure fact that one may carry the entire apparatus via handle 116 is proof that it is a much smaller and compact embodiment of the apparatus.

The next striking feature in the differences between the main embodiment and this embodiment is the means for opening and closing the lid portion 24 of the apparatus. Again, lid portion 24 is hingedly attached via piano hinge 26 along its rear face mounted against the rear wall 16 of body portion 100. The mechanism for opening and closing top portion 24 would simply comprise a first pivot arm 120 running along one side wall preferrably side wall 18 of the apparatus having a fulcrum hinge 122 with the front portion of the hinge having a foot peddle 124 for depressinginto the position as seen in phantom view in FIG. 4, so that the rear end 126 is raised to the position as seen in phantom view in FIG. 4. Hingedly connected on its rear end 126 is linkage member 128 which is linked at point 129 to member 120 on its first end and linked to the top portion 24 at 130 at its second end. Therefore, upon depressing foot peddle from the first or up position as seen in full view in FIG. 4 to the second down position as seen in phantom view, imparts upward movement to linkage pin member 128 which likewise would impart upward movement to lid 24 as seen by Arrow 132 so that access may be had for the contents of the apparatus. Therefore, rather than containing the internal linkage mechanism as required by the larger embodiments as seen in FIGS. 1-3, a single linkage member 28 linked directly to the side face of lid 24 accomplishes the same task.

In either respect, both embodiments would be constructed of a light weight material thoroughly insulated for easy movement and for assuring that the contents contained within the apparatus are maintained fresh. Again, the top member 24 would be in closed position sealed through a gasket or the like around its edge to the body portion of both embodiments so that cold air is unable to escape during use of the apparatus.

Because many varying and different embodiments may be made within the scope of the inventive concept therein taught, and because many modifications may be made in the embodiments herein detailed in accordance with the descriptive requirement of the law, it is to be understood that the details herein are to be interpreted as illustrative and not in a limiting sense.

What is claimed as invention is:
1. A bait container apparatus comprising:
   a. a main container defined by four side walls, a bottom portion, and a top portion movable between open and closed positions;
   b. a bait containing portion comprising a basket and housed within the upper section of the main container, and suspended within the main container a distance from the bottom portion of the container;
   c. a portion of the main container intermediate the bait containing portion and the floor of the container for housing ice so that the bait contained within the bait containing portion is maintained at a temperature at or about freezing; and
   d. opening and closing means, actuated by foot pressure, for moving the top portion from a closed sealing position to an open position for access into the container.
2. The apparatus in claim 1, wherein the bait containing portion further includes a plurality of orifices for allowing moisture to drop from the bait containing portion and for further allowing cool air to circulate within the bait containing portion.
3. The apparatus in claim 1, wherein the main container portion is fully insulated from the outside.
4. The apparatus in claim 1, wherein the foot actuated opening means further includes a pair of hinged members joined at a fulcrum point, the rear end of the second member further connected to a link member, so that pressure upon a foot peddle portion imparts directional movement of the linkage member in the same downward direction at the foot peddle portion for opening the container.
5. The apparatus in claim 1, further containing means associated with the main container for housing the foot actuated opening mechanism substantially within the confines of the space occupied by the main container portion.
6. A bait container for isolating the bait from the coolant within the container, the container comprising:
   a. a main container defined by side walls, a floor portion, and a top portion movable between a first sealed closed position and a second opened position;
   b. foot actuated means, associated with a top portion, for moving the top portion from the closed sealed position to the open position upon foot pressure placed upon said foot-actuating means;

c. a bait containing portion further comprising a basket suspended within substantially the top half of the container space, the bait portion further including a plurality of orifices for allowing moisture to be removed from the bait container portion;

d. an ice housing portion, contained within the main container portion, substantially beneath the bait containing portion, for collecting moisture from the bait containing portion, and for providing cool air into the bait containing portion for maintaining the bait at substantially the freezing point.

7. The apparatus in claim 6, wherein the container portion is fully insulated.

8. The apparatus in claim 6, wherein the foot actuated opening member is located substantially in the center portion of the container, housed within a recess beneath the main container portion.

9. An apparatus for containing bait, comprising:

a. a main container defined by side walls, a floor portion, and a top portion movable between a first sealed position and a second opened position;

b. means for opening the top portion, further comprising a foot actuated peddle, allowing foot pressure on the first end portion and linked to a linkage member on the second end portion, the linkage member linked directly to the top portion, so that pressure applied to the foot portion, in a down position, imparts movement of the linkage member to an up position which likewise moves the top portion from the closed seal position to the open position;

c. containing means, contained within the main portion, further including a basket having a plurality of orifices for allowing moisture to escape therefrom;

d. a portion of the main containing portion substantially beneath the bait housing portion for providing coolant such as ice to maintain the bait near a freezing state; and e. a base member associated with the main container portion, the base member further including handle means for manually carrying the container during use of the bait container.

* * * * *